United States Patent [19]

Biraghi et al.

[11] 4,024,360
[45] May 17, 1977

[54] STATION CHECKING NETWORK FOR TELECOMMUNICATION SYSTEM

[75] Inventors: Giorgio Biraghi, Cusano Milanino (Milan); Carlo Alberto Manghi, Rosate (Milan), both of Italy

[73] Assignee: Societa Italiana Telecomunicazioni Siemens S.p.A., Milan, Italy

[22] Filed: Feb. 11, 1976

[21] Appl. No.: 657,388

[30] Foreign Application Priority Data

Feb. 12, 1975 Italy .................................. 20180/75

[52] U.S. Cl. .................. 179/175.3 R; 179/175.2 R
[51] Int. Cl.² ......................................... H04B 3/46
[58] Field of Search ............ 179/175.3 R, 175.3 F, 179/175.2 R, 175.23; 340/253 Z, 172

[56] References Cited

UNITED STATES PATENTS

| | | | |
|---|---|---|---|
| 3,417,210 | 12/1968 | Chapin | 179/175.3 F |
| 3,444,336 | 5/1969 | Holt et al. | 179/175.3 F |
| 3,624,316 | 11/1971 | Roberts | 179/175.3 R |
| 3,731,012 | 5/1973 | Shaffer | 179/175.3 R |

Primary Examiner—Douglas W. Olms
Attorney, Agent, or Firm—Karl F. Ross; Herbert Dubno

[57] ABSTRACT

A marker at a central-office terminal, controlling the establishment of connections between local subscriber lines and inter-office links via an associated line concentrator/distributor, includes a source of d-c test signals of reversible polarity connectable in a phantom circuit which extends from the central office via a transmitting and a receiving branch of a local line to a subscriber station tied to that line. The subscriber station has a master switch, establishing either an inactive position or a standby position, and a hook switch closable in the standby position to initiate or accept a call. Depending on the positions of these two switches, a current discriminator at the marker detects one of three current levels (zero, low or high) with either polarity of the test signal to determine whether a call can go through or whether an alarm condition exists.

13 Claims, 2 Drawing Figures

STATION CHECKING NETWORK FOR TELECOMMUNICATION SYSTEM

FIELD OF THE INVENTION

Our present invention relates to a telecommunication system, designed to transmit speech and/or data, wherein a multiplicity of local subscriber lines served by a central office are selectively connectable to a lesser number of inter-office links for making outgoing calls to or receiving incoming calls from subscribers served by another central office or exchange.

BACKGROUND OF THE INVENTION

In such a system it is known to employ, at a switching terminal of a central office, a switch marker controlling a line concentrator/distributor which on an outgoing call connects the line of the calling subscriber to an available trunk or other inter-office link and on an incoming call connects a designated link to a selected local subscriber line; see, for example, U.S. pat. No. 3,328,534. The markers at the intercommunicating terminals are interconnected via a common signal path which carries the information relating to existing or desired connections between a given link and a local subscriber line. The line concentrator/distributor (simply referred to hereinafter as a line concentrator), inserted between $n$ subscriber lines and $m$ links where $m$ is substantially smaller than $n$, comprises a multiplicity of switches whose selective closure thus allows up to $m$ conversations to be carried out simultaneously. The marker, as a central component, communicates with the local lines and the inter-office links through the intermediary of peripheral units such as test circuits and couplers.

In a commonly owned application filed concurrently herewith by Franco De Marco and Gualtiero Rigo, Ser. No. 657,263, a circuit arrangement has been disclosed for checking the continuity of a connection established between two central-office terminals, by way of a selected link, for the exchange of messages between a calling and a called subscriber station. That system, operating with test signals of a characteristic frequency transmitted in opposite directions over respective link branches, also includes means for ascertaining the integrity of the connection established by either line concentrator between the link and the associated local line with the aid of a phantom circuit including the transmitting and the receiving branch of that line.

Such integrity checks are important in order to avoid the prolonged engagement of a link for a call which cannot go through, or which might distort the transmitted messages, because of some irregularity in the operation of the connectors of the line concentrator.

There exist, furthermore, various operational modes or conditions at a subscriber station which are unrelated to the functioning of the line connectors yet which ought to be taken into account in determining whether or not the call should proceed to the summoning of the called subscriber and the release of the centralized components serving to set up the connection. Thus, for example, a station may be out of service on account of the opening of a master switch manually operable by the subscriber or responding to a local power failure, e.g., in the case of an automatic data transceiver. Also, in the case of a called station, it may be important to determine whether the equipment happens to be off the hook so that the transmission of ringing current would be ineffectual.

OBJECTS OF THE INVENTION

The general object of our present invention, therefore, is to provide centralized mode-checking means for ascertaining the operational condition of a subscriber station in a telecommunication system of the character referred to.

A more particular object is to carry out these mode-checking operations without physically encumbering the engaged link with switches that could impair its fidelity of message transmission and might increase the likelihood of malfunction.

SUMMARY OF THE INVENTION

A central-office terminal embodying our invention comprises a source of direct current insertable, with the aid of suitable conductor means, in a phantom circuit extending by way of the transmitting and receiving branches of an associated local line to a subscriber station, the phantom circuit including mode-establishing switching means (such as the aforementioned master switch and the usual hook switch) at the subscriber station as well as impedance means effective in different positions of the switching means to vary the magnitude of a direct current emanating from the source at the terminal. Different levels of that current, indicative of different operational modes, are detected by current-sensing means at the terminal advantageously discriminating between three levels, i.e., "zero", "low" and "high."

According to a further feature of our invention, the terminal includes switchover means for reversing the polarity of the test current in two consecutive checking phases, the impedance means at the subscriber station including one or more diodes which are insertable in the phantom circuit in different switching positions. In a preferred embodiment we provide two oppositely poled diodes each in series with a resistor, one diode/resistor combination being operational in an inactive position and open-circuited in a standby position alternately established by the master switch, the other such combination being operational in the standby position with the hook switch open and being short-circuited by closure of that hook switch.

BRIEF DESCRIPTION OF THE DRAWING

The above and other features of our invention will now be described in detail, reference being made to the accompanying drawing in which.

SPECIFIC DESCRIPTION

Figure 1:
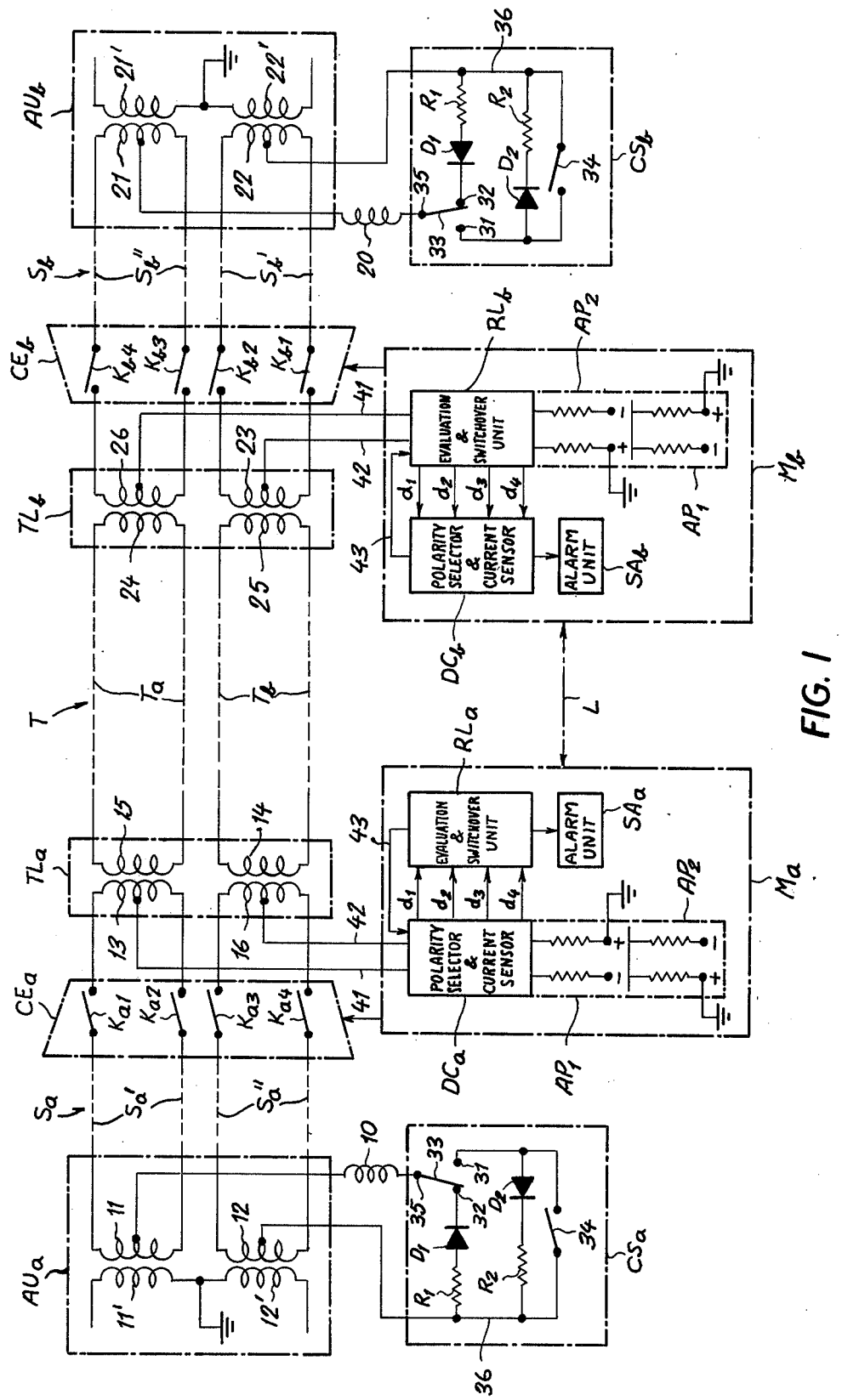
FIG. 1 is a block diagram of a telecommunication system including two terminals each provided with mode-checking means according to the invention.

The telecommunication system shown in the drawing is generally similar to a system described in a commonly owned application filed on even data herewith by Gualtiero Rigo and Carlo Alberto Manghi, Ser. No. 657,389, including two line concentrators $CE_a$ and $CE_b$ which form part of respective central-office terminals each serving a large group of local subscriber lines that can be selectively connected to a smaller number of inter-office links. The disclosure of that copending application is hereby inserted by reference into our present application. Only one subscriber station associated with each terminal has been illustrated, i.e., a station $AU_a$ connected to line concentrator $CE_a$ via a local line $S_a$ and a station $AU_b$ similarly connected to line concentrator $CE_b$ by way of a local line $S_b$. Of the several links or trunks extending between the two terminals, we show only a single trunk T. That trunk, which is representative of all the others, comprises two branches for the transmission of messages (speech or data) in opposite directions, branch $T_a$ being the outgoing one and $T_b$ being the incoming one as seen from the left-hand terminal including line concentrator $CE_a$. Each of these branches consists, at least in the vicinity of its terminals, of two conductors interconnected by a transformer winding. Between these extremities the trunk may include conventional means, not further illustrated, common to several trunks for transmitting their messages in a frequency-division mode via respective carries. Each local line includes a transmitting branch and a receiving branch respectively designated $S_a'$, $S_a''$ in the case of line $S_a$ and $S_b'$, $S_b''$ in the case of line $S_b$. Each of the line branches has a pair of through-going conductors bridged at the subscriber station by a respective inductance coil 11, 12 or 21, 22, the midpoints of these coils being interconnected by further coils 10 and 20. Coils 11, 12 and 21, 22 are inductively coupled with transformer windings 11′, 12′ and 21′, 22′ leading to nonillustrated voice and/or data transmitters and receivers within the respective stations.

Line concentrators $CE_a$, $CE_b$ comprise each a set of switches for selectively establishing, under the control of associated markers $M_a$ and $M_b$, a message-communication circuit between any local line and a specific trunk in response to the initiation of a call (closure of hook switch) by a local subscriber or the reception of dialing information from the remote marker via a signal path L, as is well known per se. The switches of line concentrator $CE_a$ serving to couple the line $S_a$ to the trunk T comprise a first connector pair $K_{a1}$, $K_{a2}$ in transmitting branch $S_a'$ and a second connector pair $K_{a3}$, $K_{a4}$ in receiving branch $S_a''$. In an analogous manner, two connector pairs $K_{b1}$, $K_{b2}$ and $K_{b3}$, $K_{b4}$ are inserted in the conductors of branches $S_b'$ and $S_b''$ within line concentrator $CE_b$ for coupling the line $S_b$ to the trunk T.

Upon the closure of switches $K_{a1}$ and $K_{a2}$, transmitting branch $S_a'$ is coupled to trunk branch $T_a$ through one of two line transformers collectively designated $TL_a$, this transformer comprising a primary winding 13 and a secondary winding 15. Similarly, closure of switches $K_{b1}$ and $K_{b2}$ couples the transmitting branch $S_b'$ to trunk branch $T_b$ by way of one of two transformers collectively designated $TL_b$, that transformer including a primary winding 23 and a secondary winding 25. The other transformer of pair $TL_a$, serving to couple the trunk branch $T_b$ to the receiving branch $S_a''$, comprises a primary winding 14 and a secondary winding 16; the corresponding transformer of pair $TL_b$, designed to couple the trunk branch $T_a$ to receiving branch $S_b''$, comprises a primary winding 24 and a secondary winding 26.

The two illustrated subscriber stations $AU_a$ and $AU_b$ include respective signaling networks $CS_a$, $CS_b$ which are of identical construction and whose components have therefore been designated by the same reference characters. Each of these networks comprises a master switch with bank contacts 31, 32 and with an armature 33 connected via a lead 35 to the midpoint of winding 11 or 21, a resistor $R_1$ connected in series with a diode $D_1$ between bank contact 32 and a lead 36 extending to the midpoint of winding 12 or 22, another resistor $R_2$ connected in series with an oppositely poled diode $D_2$ between lead 36 and bank contact 31, and a hook switch 34 having an armature connected across the series combination of resistor $R_2$ and diode $D_2$. The coils 10 and 20 shown in series with switches 33 are not required for the mode-checking circuits of our invention but have been included merely for the purpose of indicating how these circuits can be combined with those of the concurrently filed De Marco/Rigo application Ser. No. 657,263 in which each coupling transformer 13, 15 and 23, 25 has a third winding energizable by a test-signal generator of its own terminal while each transformer 14, 16 and 24, 26 has a third winding connected to a receiver for the test signal from the remote terminal, another such receiver being connected at each terminal between the center taps of windings 13 and 16 or 23 and 26 to determine the balanced or unbalanced condition of the phantom circuits formed by the four conductors of subscriber lines $S_a$ and $S_b$.

In accordance with our present invention, the aforementioned center taps of windings 13, 16 and of 23, 26 are connected across reversible sources of unipolar test currents in their respective markers $M_a$ and $M_b$. Marker $M_a$ is shown to comprise a test unit $DC_a$ including a polarity selector and a current sensor, a logic network $RL_a$ acting as an evaluation and switchover unit, and an alarm unit $SA_a$; the counterparts of these units in marker $M_b$ have been designated $DC_b$, $RL_b$, $SA_b$. In FIG. 1 each unit $DC_a$, $DC_b$ has been shown provided with two separate direct-current generators $AP_1$ and $AP_2$ of relatively inverted polarity, the positive terminals of both generators being grounded; in FIG. 2, which shows a network DC representative of both these units, a single d-c supply AP (referred to hereinafter as a battery) with reversing contacts 44 has been illustrated. Each unit $DC_a$, $DC_b$ has four output leads $d_1$–$d_4$ extending to unit $RL_a$ or $RL_b$ which in turn sends switching signals to it by way of a lead 43. Two other lead pairs 41, 42 complete respective phantom circuits, one of them extending from the center taps of windings 13 and 16 via branches $S_a'$ and $S_a''$ to switching network $CS_a$, the other extending in an analogous manner from the center taps of windings 23 and 26 over branches $S_b'$ and $S_b''$ to network $CS_b$.

When the master switch 33 of either subscriber station is in an "off" position (engaging its contact 32), as when the subscriber there is absent or does not wish to be disturbed, the station is considered inactive and is characterized by insertion of resistor $R_1$ and diode $D_1$ in its phantom circuit. When this switch is turned "on" to engage its contact 31 the station is in a standby mode as long as the hook switch 34 is open; in that instance the phantom circuit extends through diode $D_2$ and resistor $R_2$, thus giving passage to currents of opposite polarity as compared with the previous case. Closure of hook switch 34 in that standby position, for the purpose of initiating or accepting a call, establishes a working mode in which the midpoints of coils 11 and 12 or 21 and 22 are short-circuited for direct current.

In addition, the system according to our invention also detects such off-normal conditions as a break in the current path extending from lead 41 to lead 36 by way of connectors $K_{a1}$, $K_{a2}$ (or $K_{b1}$, $K_{b2}$), a break in the current path extending from lead 42 to lead 36 by way of connector $K_{a3}$, $K_{a4}$ (or $K_{b3}$, $K_{b4}$), as well as the presence of ground or battery potential on any of these leads.

For this purpose the current sensor within unit $DC_a$ or $DC_b$ discriminates between these levels, i.e., "zero," "low," "high," energizing its outputs $d_1$— $d_4$ as follows:

$d_1$ — high current on lead 41
$d_2$ — high current on lead 42
$d_3$ — low current on lead 41
$d_4$ — low current on lead 42.

Obviously $d_1 \cdot d_3 = d_d \cdot d_4 = 0$.

Let us consider the following typical modes of operation:

a. Calling subscriber with line intact

Upon the closure of switches $K_{a1}$– $K_{a4}$ of line concentrator $CA_a$ under the control of a nonillustrated link allocator in marker $M_a$, for the purpose of establishing a communication circuit to a remote junction and as line concentrator $CE_b$, unit $RL_a$ connects the selector $DC_a$ across its battery $AP_1$ to supply negative potential to lead 41 and to ground the lead 42. With switch 33 of network $CA_a$ in its "on" position, and with switch 34 closed, leads 41 and 42 are in series with a low-resistance path if switches $K_{a1}$ – $K_{a4}$ are properly closed so that $$d_1 \, d_2 \, \overline{d_3} \, \overline{d_4} = 1.$$

The same situation is observed upon a subsequent reversal of polarity under the control of unit $RL_a$, i.e., with substitution of battery $AP_2$ for battery $AP_1$.

It may be pointed out that the inductances of respective halves of windings 11 – 13 and 16 cancel each other if all connector switches are closed but fail to do so if one switch of either or both pairs $K_{a1}$, $K_{a2}$ and $K_{a3}$, $K_{a4}$ is open. Thus, if the common series inductance 10 is small compared with that of any of these winding halves, the buildup of current flow on leads 41 and 42 will be significantly delayed whereby outputs $d_3$ and $d_4$ will conduct before outputs $d_1$ and $d_2$. This affords a further check if the test currents are applied only for short periods, i.e., as unipolar pulses.

b. Ground or battery potential on lead of calling subscriber line

If one of the line branches $S_a'$, $S_a''$ is accidentally grounded or connected to negative battery voltage, the same potential will be present on the other line branch in the working position (switch 34 closed) so that one of the leads 41, 42 will carry a large current while the other will be virtually de-energized. With unit $DC_a$ connected across supply $AP_1$ (switchover phase I), grounding will result in current flow on lead 41 but not on lead 42; the opposite will be the case if the circuit is at battery potential. Upon a changeover to the alternate supply $AP_2$ (switchover phase II), conditions are reversed. Thus, the logical equation in either case is $$d_1 \, d_2 + d_1 \, \overline{d_2}) \, \overline{d_3} \, \overline{d_4} = 1.$$

c. Calling subscriber hangs up

If the subscriber at station $AU_a$ reopens the hook switch 34 after closing it just long enough to cause a response by the marker $M_a$, current can flow only through diode $D_2$ in series with resistor $R_2$ and will therefore be blocked if lead 41 is more negative than lead 42. Thus, the outputs of the test unit will satisfy the equation $$\overline{d_1} \, \overline{d_2} \, \overline{d_3} \, \overline{d_4} = 1$$

in the first switchover phase, i.e., with supply $AP_1$ in circuit, and the equation $$\overline{d_1} \, \overline{d_2} \, d_3 \, d_4 = 1$$

in the second phase in which supply $AP_2$ is operational.

d. Calling subscriber aborts call by reversing master switch

If the subscriber at station $AU_a$ reverses the switch 33 in network $CS_a$ shortly after having initiated a call, an attenuated test current will flow through resistor $R_1$ and diode $D_1$ in the first phase but none will flow in the second phase. The last two equations again apply, but in the reverse order.

e. Break in line of calling subscriber

If either or both connector pairs $K_{a1}$, $K_{a2}$ and $K_{a3}$, $K_{a4}$ fail to close, no current of either polarity can flow over leads 41, 42 so that $$\overline{d_1} \, \overline{d_2} \, \overline{d_3} \, \overline{d_4} = 1$$

in both switchover phases.

f. Called subscriber station inactive

Switch 33 in network $CS_b$ is in its "off" position, thereby inserting the diode $D_1$ and the resistor $R_1$ in the phantom circuit. Current from unit $DC_b$ is now blocked if lead 41 is more negative than lead 42, i.e., in the first switchover phase. In the second phase the sensing circuit within that unit detects a low current on both leads, i.e., $$\overline{d_1} \, \overline{d_2} \, d_3 \, d_4 = 1.$$

g. Ground or battery potential on lead of called subscriber line

With switch 34 of network $CS_b$ open, ground or negative battery potential may be present on either branch $S_b'$, $S_b''$. In the first phase, with supply $AP_1$ operational, a weak current may flow through diode $D_2$ and resistor $R_2$ either from lead 41 via branch $S_b'$ to ground on branch $S_b''$ or from battery potential on branch $S_b'$ via branch $S_b''$ to ground on lead 42. Negative potential on branch $S_b''$ produces a large current on lead 42 alone; ground on branch $S_b'$, similarly, gives rise to a large current only on lead 41. In the second phase, with diode $D_2$ reverse-biased by supply $AP_2$, no weak currents will flow but a strong current may be present on either lead 41 or lead 42. Thus, we can write $$\overline{d_1} \, \overline{d_2} \, (d_3 \, \overline{d_4} + \overline{d_3} \, d_4) + \overline{d_3} \, \overline{d_4} \, (d_1 \, \overline{d_2} + \overline{d_1} \, d_2) = 1$$

for phase I and $$\overline{d_1} \, \overline{d_2} \, \overline{d_3} \, \overline{d_4} + \overline{d_3} \, \overline{d_4} \, (d_1 \, \overline{d_2} + \overline{d_1} \, d_2) = 1$$

for phase II.

h. Called subscriber station in standby condition with line intact

This condition is comparable to situation (c) and the same equations apply.

i. Called subscriber station inactive but with line intact

This condition corresponds to situation (d).

j. Break in line of called subscriber

The same as in situation (e).

Logic network $RL_1$ or $RL_2$, by temporarily storing the results of the first switchover phase, thus has available in the second phase a large variety of logical signal combinations from which it may determine, on the basis of information present in the marker as to whether a calling or a called station is involved, if the call is to proceed, if a retry should be carried out under the control of unit $SA_a$ or $SA_b$, or if that unit should be actuated to register a malfunction with possible emission of an alarm signal.

Figure 2:
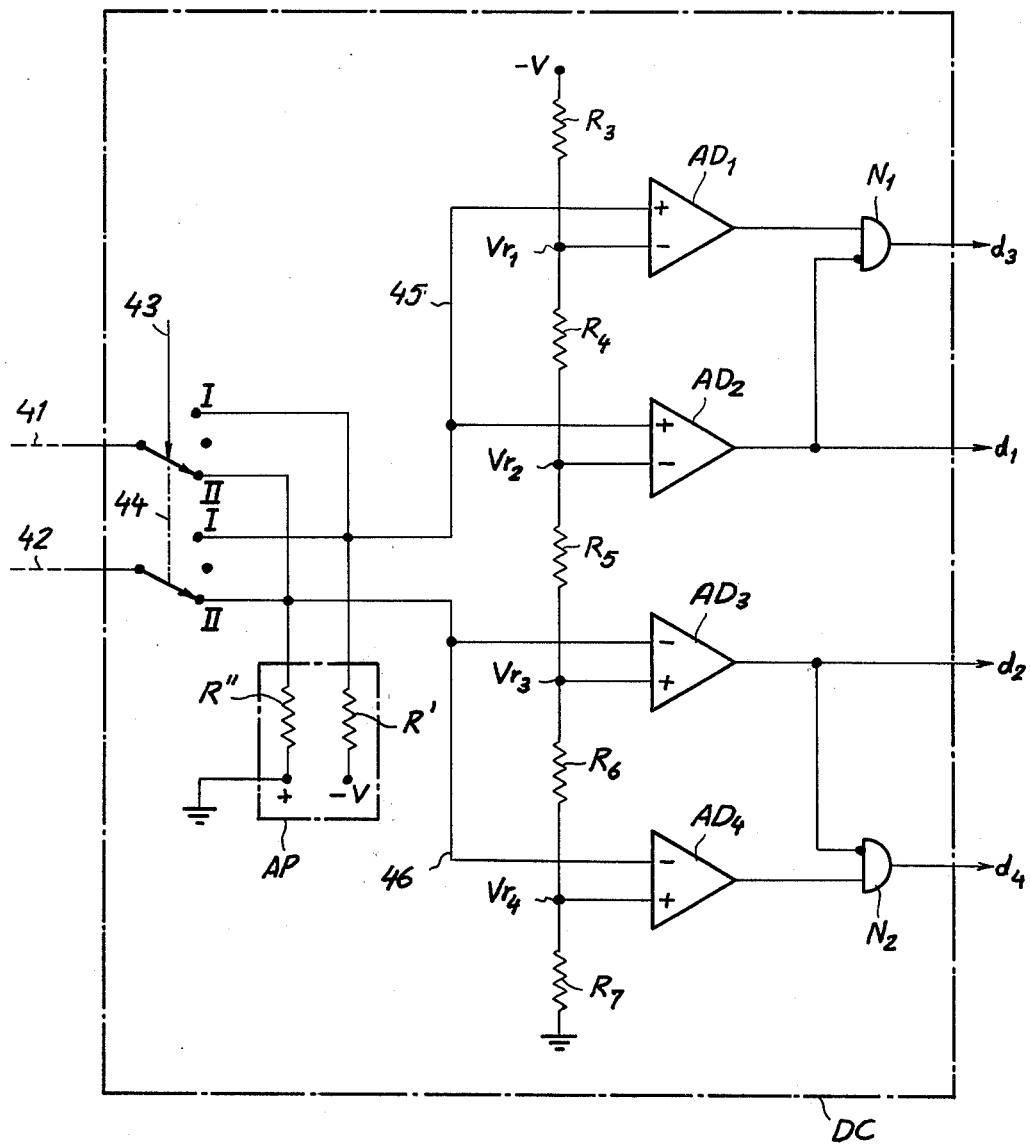
FIG. 2 is a more detailed circuit diagram of a current-level sensor forming part of the mode-checking means.

As shown in FIG. 2, unit CD (representative of sensors $DC_a$ and $DC_b$) comprises a voltage divider $R_3 - R_7$ connected between negative battery voltage $-V$ and ground. A first bus bar 45, tied to the negative pole of supply battery AP by way of a resistor $R'$, and a second bus bar 46, grounded by way of a resistor $R''$, are alternately connectable to leads 41 and 42 in respective operating positions of a reversing switch 44; these positions have been designated I and II, corresponding to the first and second phases referred to above.

Four differential amplifiers $AD_1 - AD_4$ have inputs tied to respective junctions of voltage divider $R_3 - R_7$ carrying progressively less negative reference potentials $Vr_1 - Vr_4$. Noninverting sensing inputs (+) of amplifiers $AD_1$ and $AD_2$ are connected in parallel to bus bar 45 whereas inverting sensing inputs (−) of amplifiers $AD_3$ and $AD_4$ are connected in parallel to bus bar 46. Amplifiers $AD_1$ and $AD_2$ conduct when the negative voltage on their noninverting sensing inputs has an absolute value less than that of the potentiometer voltage on their inverting reference inputs; in the case of amplifiers $AD_3$ and $AD_4$ the opposite is the case.

Resistors $R'$ and $R''$ are small compared with resistors $R_1$ and $R_2$ (FIG. 1). When the resistance of the phantom circuit is low, as in situation (a), the voltage drop across each resistor $R'$, $R''$ represents almost half the supply voltage $-V$ so that both bus bars 45 and 46 carry voltages intermediate the two reference potentials $Vr_2$ and $Vr_3$ whereby all four differential amplifiers conduct. The output voltages of amplifiers $AD_2$ and $AD_3$, representing the signals $d_1$ and $d_2$, are fed to inverting inputs of respective AND gates $N_1$, $N_2$ in the outputs of amplifiers $AD_1$ and $AD_4$ with resulting suppression of signals $d_3$ and $d_4$ that would otherwise appear in the outputs of these NAND gates; these latter signals, therefore, come into existence only when the phantom circuit includes a resistor $R_1$ or $R_2$ in series with resistor $R'$ or $R''$, i.e., when the voltage of bus bar 45 lies between potentials $Vr_1$, $Vr_2$ or the voltage of bus bar 46 lies between potentials $Vr_3$, $Vr_4$.

Since $d_1$ and $d_2$ as well as $d_3$ and $d_4$ are always interchangeable in the foregoing Boolean equations, it is immaterial for the evaluation networks $RL_1$ and $RL_2$ whether leads 41 and 42 are respectively connected to bus bars 45 and 46 (switch position I) or vice versa (position II).

It will be understood that switch 44 is representative of a multiplicity of switches selectively operable by the respective marker for connecting the bus bars 45, 46 to a pair of leads 41, 42 from any pair of coupling transformers $TL_a$ or $TL_b$ included in an established communication circuit.

The circuitry hereinabove described may be used in a telecommunication system with hot-line connections, i.e., with markers programmed to connect a certain subscriber line of one terminal invariably with a specific subscriber line of another terminal, as disclosed and claimed in commonly owned application Ser. No. 440,450 filed 7 Feb. 1974 by Luigi Falcone.

We claim:

1. In a telecommunication system with a terminal, at least one link with an outgoing branch and an incoming branch originating at said terminal, a local line with a transmitting branch and a receiving branch extending between said terminal and a subscriber station, connector means at said terminal for respectively coupling the transmitting and receiving branches of said local line to the outgoing and incoming branches of said link to facilitate the exchange of messages between said local line and a remote junction, and switching means at said subscriber station with a plurality of positions corresponding to different operational modes, the combination therewith of mode-checking means comprising:

a source of direct current at said terminal; conductor means for inserting said source in a phantom circuit extending by way of said transmitting and receiving branches of said local line to said subscriber station, said phantom circuit including said switching means and further including impedance means at said subscriber effective in different position of said switching means to vary the magnitude of a direct current flowing from said source through said phantom circuit;

current-sensing means connected to said phantom circuit at said terminal for discriminating between direct currents of different levels indicative of said different operational modes, and switchover means connected to said source at said terminal for revesing the polarity of said direct current;

said impedance means including two oppositely poled diodes respectively insertable in said phantom circuit in different positions of said switching means.

2. The combination defined in claim 1 wherein said impedance means further comprises a resistor in series with each of said diodes, said resistor being ineffectual in certain of said positions, said current-sensing means being adapted to discriminate among three distinct current levels.

3. The combination defined in claim 2 wherein said switching means includes a first and a second switch in tandem, said first switch having an inactive position and a standby position, said second switch being normally open and being closable for completing a message-communication circuit through said local line in said standby position of said first switch, one of said diodes and its series resistor being operational in said inactive position and being open-circuited by said first switch in said standby position, the other of said diodes and its series resistor being operational in said standby position with said second switch open and being short-circuited by said second switch upon closure thereof.

4. The combination defined in claim 1 wherein said terminal further comprises a first transformer coupling said transmitting branch to said outgoing branch and a second transformer coupling said incoming branch to said receiving branch, said transmitting branch including a first pair of leads connected across a secondary winding of said second transformer, said conductor means connecting said source across respective center taps of said primary and secondary windings, said connector means being inserted in said leads.

5. The combination defined in claim 4 wherein said phantom circuit comprises a first conductive termination connected across the leads of said transmitting branch and a second conductive termination connected across the leads of said receiving branch at said subscriber station, said switching means being operable to establish a d - c connection between respective midpoints of said first and second terminations.

6. The combination defined in claim 5 wherein said terminations are inductances.

7. The combination defined in claim 1 wherein said local line is one of a multiplicity of such lines selectively couplable by said connector means to said link, said mode-checking means being part of a marker controlling said connector means in response to switching signals from any local line and from said remote junction.

8. The combination defined in claim 7 wherein said marker includes alarm-indicating means controlled by said mode-checking means.

9. In a telecommunication system with a terminal, at least one link with an outgoing branch and an incoming branch originating at said terminal, a local line with a transmitting branch and a receiving branch extending between said terminal and a subscriber station, connector means at said terminal for respectively coupling the transmitting and receiving branches of said local line to the outgoing and incoming branches of said link to facilitate the exchange of messages between said local line and a remote junction, and switching means at said subscriber station with a plurality of positions corresponding to different operational modes, the combination therewith of mode-checking means comprising:
   a source of direct current at said terminal;
   conductor means for inserting said source in a phantom circuit extending by way of said transmitting and receiving branches of said local line to said subscriber station, said phantom circuit including said switching means and further including impedance means at said subscriber station effective in different positions of said switching means to vary the magnitude of a direct current flowing from said source through said phantom circuit;
   current-sensing means connected to said phantom circuit at said terminal for discriminating between direct currents of different levels indicative of said different operational modes;
   a first transformer at said terminal coupling said transmitting branch to said outgoing branch; and
   a second transformer at said terminal coupling said incoming branch to said receiving branch;
   said transmitting branch including a first pair of leads connected across a primary winding of said first transformer, said receiving branch including a second pair of leads connected across a secondary winding of said second transformer, said conductor means connecting said source across respective center taps of said primary and secondary windings, said connector means being inserted in said leads.

10. The combination defined in claim 9 wherein said phantom circuit comprises a first conductive termination connected across the leads of said transmitting branch and a second conductive termination connected across the leads of said receiving branch at said subscriber station, said switching means being operable to establish a d-c connection between respective midpoints of said first and second terminations.

11. The combination defined in claim 10 wherein said terminations are inductances.

12. The combination defined in claim 9 wherein said local line is one of a multiplicity of such lines selectively couplable by said connector means to said link, said mode-checking means being part of a marker controlling said connector means in response to switching signals from any local line and from said remote junction.

13. The combination defined in claim 12 wherein said marker includes alarm-indicating means controlled by said mode-checking means.

* * * * *